United States Patent [19]

Nishijima et al.

[11] 3,887,520

[45] June 3, 1975

[54] STABILIZED POLYAMIDE COMPOSITION

[75] Inventors: Kiyoaki Nishijima; Atsuo Tanaka, both of Mihara, Japan

[73] Assignee: Allied Chemical Corporation, Petersburg, Va.

[22] Filed: Jan. 30, 1974

[21] Appl. No.: 438,131

[52] U.S. Cl......... 260/45.75 C; 260/18 N; 260/45.8
[51] Int. Cl............................................. C08g 51/62
[58] Field of Search....... 260/45.8 N, 45.75 C, 18 N

[56] References Cited
UNITED STATES PATENTS 3,280,053  10/1966  Twilley ................................. 260/18

3,516,956  6/1970  Reedy et al........................... 260/22

FOREIGN PATENTS OR APPLICATIONS
994,577  4/1962  United Kingdom

*Primary Examiner*—V. P. Hoke
*Attorney, Agent, or Firm*—Richard A. Anderson

[57] ABSTRACT

A polyamide composition containing a) 2-mercaptobenzimidazol, b) 2-mercaptobenzimidazol copper salt and/or organic acid copper salt and one or more magnesium compounds from the group c) 8-hydroxyquinoline magnesium salt, magnesium salt of a) and an organic acid magnesium salt, is disclosed.

3 Claims, No Drawings

STABILIZED POLYAMIDE COMPOSITION

BACKGROUND OF THE INVENTION

This invention pertains to the polymer composition which is excellent for heat resistance, effective in drip prevention, and does not bring corrosion at all against polyamide manufacturing and treating equipment.

Polyamide, in general, is easily influenced by oxidation, and due to this oxidation, it has properties, particularly, at high temperatures, to lower molecular weight, create cross linking at times, and also changes easily its color and properties.

To prevent such heat degradation, several heat degradation prevention methods were proposed in the past, for example, it has been known that when 2-mercaptobenzimidazol (below abbreviated to "MBI") and copper compounds are added to polyamide, polyamide composition which is excellent to heat resistance is obtained. (Reference to British Pat. No. 945,186). However, conventional copper compounds, for instance, chloride copper, or bromide copper were used in combination with MBI, due to their correlation effect, the corrosion on various polyamide manufacturing and treatment equipment becomes severe, in particular, in case polyamide is nylon 6, the effect is greater during leaching process, and the compounds could not be used in practice, or were used knowing the necessity for repairs and replacement.

Moreover, even though MBI and copper compound mixture improves heat resistance, it provides insufficient spinnability, extremely susceptible to drips, reduces rate of production, also lowers its draw ratio and invites worse drawn yarn properties.

As mentioned above, to improve the heat resistant property, it is extremely advantageous to combine MBI and copper compounds, but depending on the types of copper compounds used, there is notable corrosive reaction.

The inventors, as a result of detailed study on this phenomenon, found that when inorganic copper salt and MBI are combined, due to their correlation, the corrosive reaction occurs. That is, no corrosive reaction occurs by MBI alone, and also a very little corrosive action occurs by inorganic copper salt alone, and there is no real trouble in practice, but when these two materials exist together, then the notable corrosive reaction beings to occur. And also, it was discovered that in this phenomenon, copper itself is not involved, but negative ions originated from copper salt and MBI are involved.

Accordingly, to prevent such corrosive reaction using MBI, the chemical compounds to be used together with MBI must not have in the first place negative ions which induce corrosive reaction, and also have sufficiently high solubility for polyamides.

Based on these findings, the inventors made intensive study on polyamide compositions to improve frequent drip occurence and corrosion which are flaws for the MBI containing polyamide composites, moreover, the inventors studied the polyamide compositions which would not lose its excellent heat resistant property because of having MBI in its composites. As a result of the study, the inventors found that polyamide compositions which contain MBI and copper salt and magnesium salt of specific compounds satisfy conditions described above, and arrived to this invention.

SUMMARY OF THE INVENTION

This invention is the polyamide composition which is characterized by containing a) 2-mercaptobenzimidazol, b) 2-mercaptobenzimidazol copper salt and/or organic acid copper salt, along with c) 2-mercaptobenzimidazol magnesium salt, organic acid magnesium salt and/or 8-hydroxyquinoline magnesium salt.

Polyamide as mentioned in this invention covers all fiber-forming type polyamide obtainable from polymerizable diamine and dibasic acids, monoamine mono-carboxy acid, or similar amide forming derivatives. These polyamides include not only nylon 6, 66, 610, etc. of aliphatic polyamides, but also include polyamides which have aromatic ring, aliphatic ring, and heterocyclic ring in their main chains, for example, polyhexamethylene isophthalimide. In this invention, among these polyamides, nylon 6, nylon 66, and their copolymers are particularly best suitable for this invention.

MBI-copper salt to be used as (b) component as given in this invention could be obtained from a regular method, for example, by reaction between the reaction product of MBI and caustic soda and halogenated copper. However, it is most necessary to rinse sufficiently so that there would not be any corrosive provoking negative ions remaining in the MBI-copper salt.

As examples on organic acid copper salt, there are acetic acid copper, valeric acid copper, capric acid copper, lauric acid copper, stearic acid copper, oleic acid copper, benzoic acid copper, etc. The quantity of these copper compounds to be used for polyamides ranges from about 10 to about 500 ppm based on the metallic copper conversion calculation.

It is not expected to improve any further against heat resistance even used more than 500 ppm, and also for less than 10 ppm the heat resistance improvement is particularly not expected. The quantity of MBI of (a) component to be used in combination with (b) component for polyamide is in the range of from about 0.01 to about 5 weight percent, preferably 0.1 to 2.0 weight percent. For the quantity less than 0.01 percent, the heat resistant improvement is insufficient, and, on the other hand, quantity more than 5 weight percent use would make the effect of further improvement unrecognizable.

From polyamide composites containing (a) and (b) components, polyamide compositions which possess heat resistant property at high temperatures and yet resist to corrosion could be obtained, but these compositions have poor spinnability and susceptible to drips. These drips could be reduced by using above (a) and (b) components along with magnesium compound, but magnesium compound and a copper compound require absence of corrosion type negative ions, and also possess sufficient solubility for polyamides. The (c) components to be used in this invention were discovered as a result of several examinations which satisy conditions as magnesium compound, and they are MBI-magnesium salt, 8-hydroxy quinoline magnesium salt, and organic acid magnesium salt.

MBI-magnesium salt and 8-hydroxy quinoline magnesium salt to be applied as (c) component in this invention could be obtained from regular methods, for example, by chemical process of chemical reaction products with caustic soda and halogenated magnesium. However, for either case, it is necessary to rinse out sufficiently to remove corrosion type negative ions completely. Also, as for organic acid magnesium salt, the magnesium salt types could be acetic acid, propionic acid, butyric acid, valeric acid, lauric acid, myristic acid, palmitic acid, stearic acid, oleic acid, benzoic acid, phthalic acid, etc. The quantity of these magnesium compounds to be applied on polyamides is in the range of about 5 to 150 ppm based on the metallic magnesium conversion calculation. Using less than 5 ppm, one cannot expect to prevent drips, and on the other hand, using more than 150 ppm, the further improvement for its effectiveness is not expected.

The compositions described in this invention have several optional methods for preparation. For example, more than one components of aforementioned (a), (b) and (c) components could be added to polyamide raw materials before polymerization, during polymerization, or to the chips. Polyamides containing (a), (b) and (c) components disclosed in this invention may also contain discoloration prevention agent, heat resistant stabilizing agent, ultraviolet stabilizing agent, electrification prevention agent, polymerization stabilizing agent, brightening agent, etc.

The polyamide composites disclosed in this invention have, in spite of MBI content, excellent drip prevention properties because of its having particular copper salt and magnesium salt, have not shown corrosion on various polyamide process equipment, and, in addition, retain heat resistant property characteristics of MBI containing polyamide composites without losing even slightly.

DESCRIPTION OF THE PREFERRED EMBODIMENTS

In the following actual examples are given. In these examples, the percent indicating quantity applied is meant weight percent applied, and "heat resistant property" is measurement obtained from the filament before and after treating the filament at 180°C. (in air) for 4 hours and used filament strength retention ratio (strength after heat treatment/strength before heat treatment X 100 percent) and filament elongation retention ratio (elongation after heat treatment/elongation before heat treatment X 100 percent) as a scale for measuring heat resistant property.

The "corrosion property" is determined by weight loss of 60 gram stainless steel test piece (SUS 27) immersed for 6 days at 90°C. into 200 ml chip extract which has been extracted for 10 hours with 98°C. pure water in a solution ratio of 3 which extract is condensed to 50 to 1 (by volume).

Also, "intrinsic viscosity" is a value measured in m-cresol at 35°C.

EXAMPLE 1

Obtained 1.55 intrinsic viscosity polyamide from a conventional polymerization method with addition of 0.3 percent each of MBI and 150 ppm of copper compound (analyzed as copper metal) and 40 ppm of magnesium compound (analyzed as magnesium metal) as shown in the following table into epsilon-caprolactam during the manufacturing of nylon 6.

This polyamide composition was spun at 275°C. spinning temperature, 600 m/minute spinning speed using a spinnerette which has 24 0.6 mm diameter capillaries and takeup wound as undrawn yarn. The obtained fiber had a 210 denier, 8.5 grams per denier tenacity, 11.8 percent elongation, 10.7 percent boiling water shrinkage after drawing of the undrawn yarn at a draw ratio of 4.6 times with use of a titanium dioxide pin and 190°C. hot plate at speed of 300 m/minute.

The results of heat stability, corrosion characteristic, and measurement on drip occurrence time is shown in Table 1. The "drip occurrence time" is the time at which a drip occurs after starting spinning. (The "drip occurrence time" in the next example is also the same definition).

For comparison, various polyamide composites were obtained (intrinsic viscosity of polyamide and drawing conditions are the same as above described example) from (1) case of adding MBI only, (2) case of adding MBI and MBI-copper salt (3) case of adding MBI and inorganic copper salt and magnesium salt (4) case of adding inorganic copper salt and magnesium salt and performed the same measurement which results were listed in Table 1.

TABLE 1

| Example | MBI (%) | Copper Compound 150 ppm as Copper Metal | Magnesium Compound 40 ppm as Magnesium Metal | Heat Stability | | Drip Occurrence Time (Hours) | Corrosion Reduction Quantity (Grams) |
|---|---|---|---|---|---|---|---|
| | | | | Tenacity Retention Ratio (%) | Elongation Retention Ratio (%) | | |
| Example of This Invention | 0.3 | MBI Copper Salt | Magnesium Acetate* | 100 | 100 | >72 | 0 |
| Examples for Comparison | 0.3 | — | — | 30 | 21 | 24 | 0 |
| | 0.3 | MBI Copper Salt | — | 100 | 100 | 30 | 0 |
| | 0.3 | CuCl₂ | Magnesium Acetate* | 100 | 100 | >72 | 60 |
| | 0 | CuCl₂ | MgCl₂ | 91 | 90 | 66 | 2 |

*Mg(OCH₃CO)₂

From the above table, it can be clearly understood that the polyamide composite from this invention was shown to be far superior in heat stability, effective in prevention of drips and resistance to corrosion.

EXAMPLE 2

To investigate the effect of various copper compound and magnesium compound combination in the actual example 1, method, polyamide compositions were obtained from varying combinations of both compounds as shown in Table 2, and the effect of each case's test results were shown in Table 2, the MBI in each case of combination was 0.3 percent, copper was 150 ppm, magnesium was 40 ppm and intrinsic viscosity of polymer was 1.55. Spinning and drawing of yarn was carried as exactly the same conditions in actual Example 1.

TABLE 2

| Copper Compound | Magnesium Compound | Heat Stability | | Drip Occurrence Time (Hours) | Corrosion Reduction Quantity (Grams) |
| --- | --- | --- | --- | --- | --- |
| | | Tenacity Retention Ratio (%) | Elongation Retention Ratio (%) | | |
| Copper Acetate* | Magnesium Acetate** | 100 | 100 | >72 | 0 |
| Copper Acetate* | Mg salt of MBI | 100 | 100 | >72 | 0 |
| MBI Copper Salt | Mg salt of 8-hydroxy quinoline | 100 | 100 | >72 | 0 |
| Copper Benzoate | Magnesium Stearate | 100 | 100 | >72 | 0 |

*Cu(OCH₃CO)₂
**Mg(OCH₃CO)₂

EXAMPLE 3

A 1.60 intrinsic viscosity polymer was obtained with adding MBI, MBI copper salt and magnesium acetate to the 6.6 salt during manufacturing of nylon 6.6 with a conventional polymerization. This polymer contained 0.25 percent of MBI, 130 ppm of copper, 30 ppm of magnesium. The spun and drawn yarn from this polyamide composite had the heat stability of 100 percent in both tenacity retention ratio and elongation retention ratio and drip occurrence time was 66 hours, also there were no noticeable corrosion characteristics.

We claim:
1. In a composition consisting essentially of a polyamide, containing, based on the weight of said polyamide,
   a. from about 0.01 weight percent to about 5 weight percent 2-mercaptobenzimidazol, and
   b. from about 10 parts per million to about 500 parts per million, analyzed as copper metal, of a compound selected from the group consisting of the copper salt of 2-mercaptobenzimidazol and an organic acid copper salt, the improvement comprising said polyamide also containing
   c. from about 5 parts per million to about 150 parts per million, analyzed as magnesium metal, of a compound selected from the group consisting of the magnesium salt of 2-mercaptobenzimidazol, and 8-hydroxyquinoline magnesium salt.

2. The polyamide composition of claim 1 wherein the 2-mercaptobenzimidazol is present in an amount of from about 0.1 weight percent to about 2 weight percent.

3. In a method to reduce drip occurrence during spinning of a heat resistant, corrosion resistant polyamide composition, containing, based on the weight of said polyamide,
   a. from about 0.01 weight percent to about 5 weight percent 2-mercaptobenzimidazol, and
   b. from about 10 parts per million to about 500 parts per million, analyzed as copper metal, of a compound selected from the group consisting of the copper salt of 2-mercaptobenzimidazol and an organic acid copper salt, the improvement comprising adding to said polyamide, prior to spinning,
   c. from about 5 parts per million to about 150 parts per million, analyzed as magnesium metal, of a compound selected from the group consisting of the magnesium salt of 2-mercaptobenzimidazol, and 8-hydroxyquinoline magnesium salt.

* * * * *